(12) United States Patent
Voss et al.

(10) Patent No.: US 9,444,986 B2
(45) Date of Patent: *Sep. 13, 2016

(54) REMOTE CONTROL UNIT FOR AN OBJECTIVE AND FOR A CAMERA

(71) Applicant: Arnold & Richter Cine Technik GmbH & Co. Betriebs KG, Munich (DE)

(72) Inventors: Hendrik Voss, Munich (DE); Leonard Preymann, Korneuburg (AT)

(73) Assignee: Arnold & Richter Cine Technik GmbH & Co. Betriebs KG, Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/734,261

(22) Filed: Jun. 9, 2015

(65) Prior Publication Data

US 2015/0271378 A1 Sep. 24, 2015

Related U.S. Application Data

(63) Continuation of application No. 14/017,682, filed on Sep. 4, 2013, now Pat. No. 9,083,876.

(30) Foreign Application Priority Data

Sep. 6, 2012 (DE) .................. 10 2012 215 861

(51) Int. Cl.
*H04N 5/232* (2006.01)
*G03B 3/12* (2006.01)
(Continued)

(52) U.S. Cl.
CPC .............. *H04N 5/232* (2013.01); *G03B 3/12* (2013.01); *G03B 13/34* (2013.01); *G03B 17/18* (2013.01); *H04N 5/23209* (2013.01)

(58) Field of Classification Search
USPC ....... 348/14.02, 211.2, 211.7, 211.8, 211.99; 345/156; 396/56–59
See application file for complete search history.

(56) References Cited

U.S. PATENT DOCUMENTS

| | | | |
|---|---|---|---|
| 1,566,069 A | 12/1925 | Buchholz et al. | |
| 2,693,165 A | 11/1954 | Appleman | |
| 2,744,185 A | 5/1956 | Cawley | |

(Continued)

FOREIGN PATENT DOCUMENTS

| | | | |
|---|---|---|---|
| DE | 4219331 A1 | 12/1993 | |
| DE | 19534762 A1 | 3/1996 | |

(Continued)

OTHER PUBLICATIONS

German Search Report dated Sep. 2, 2013 relating to German Patent Application No. 10 2012 215 861.8.

(Continued)

*Primary Examiner* — Twyler Haskins
*Assistant Examiner* — Akshay Trehan
(74) *Attorney, Agent, or Firm* — Dinsmore & Shohl LLP; Douglas W. Sprinkle (57) ABSTRACT

A remote control unit for an objective and a camera comprises a base part, an operating element movable relative to the base part, an evaluation and control unit for generating a control signal in accordance with the position of the operating element and an output device for outputting the control signal to an associated camera. The evaluation and control device is adapted to control a feedback device of the control unit in dependence on the position of the operating element to generate at least one feedback signal perceivable by a user.

17 Claims, 5 Drawing Sheets

(51) Int. Cl.
*G03B 13/34* (2006.01)
*G03B 17/18* (2006.01)

(56) References Cited

U.S. PATENT DOCUMENTS

| | | |
|---|---|---|
| 2,823,639 A | 2/1958 | Vistain, Jr. et al. |
| 3,619,594 A | 11/1971 | Morez |
| 4,964,004 A | 10/1990 | Barker |
| 5,564,812 A | 10/1996 | Berardi |
| 5,808,665 A | 9/1998 | Green |
| 5,913,414 A | 6/1999 | Pollock et al. |
| 6,627,829 B2 | 9/2003 | Sato |
| 6,819,867 B2 | 11/2004 | Mayer, Jr. et al. |
| 6,860,224 B2 | 3/2005 | Snider |
| 7,105,579 B2 | 9/2006 | Adam et al. |
| 7,195,363 B2 | 3/2007 | Horoho et al. |
| 7,205,495 B2 | 4/2007 | Mazur |
| 8,079,723 B2 | 12/2011 | Gerchman et al. |
| 8,253,920 B2 | 8/2012 | Bauer et al. |
| 2003/0025802 A1* | 2/2003 | Mayer, Jr. ............... G03B 7/12 348/211.99 |
| 2003/0210329 A1 | 11/2003 | Aagaard et al. |
| 2005/0030284 A1* | 2/2005 | Braun .................. G06F 3/016 345/156 |
| 2005/0140816 A1 | 6/2005 | Tschida et al. |
| 2008/0002033 A1* | 1/2008 | Ito ....................... H04N 5/23212 348/211.99 |
| 2008/0031610 A1 | 2/2008 | Border et al. |
| 2008/0084481 A1 | 4/2008 | Lindsay |
| 2009/0073388 A1 | 3/2009 | Dumm |
| 2010/0165138 A1 | 7/2010 | Jannard |
| 2010/0231541 A1* | 9/2010 | Cruz-Hernandez ... G06F 3/0488 345/173 |
| 2012/0019702 A1* | 1/2012 | Richter .................... G03B 3/12 348/333.02 |
| 2012/0249315 A1 | 10/2012 | Vanhelle et al. |
| 2013/0182137 A1 | 7/2013 | Voss |

FOREIGN PATENT DOCUMENTS

| | | |
|---|---|---|
| DE | 196 29 484 A1 | 1/1998 |
| DE | 102010017995 B3 | 6/2011 |
| EP | 1 697 876 B1 | 3/2009 |
| JP | 10-078609 A | 3/1998 |
| JP | 10-0786609 A | 3/1998 |
| WO | 2010/046237 A1 | 4/2010 |
| WO | 2011/033193 A1 | 3/2011 |
| WO | 2011/050867 A1 | 5/2011 |

OTHER PUBLICATIONS

ARRI Professional Camera Accessories Brochure dated Apr. 1, 2010, pp. 1-4, 18-30.

* cited by examiner

REMOTE CONTROL UNIT FOR AN OBJECTIVE AND FOR A CAMERA

CROSS-REFERENCE TO RELATED APPLICATIONS

This application is a continuation of U.S. patent application Ser. No. 14/017,682 filed Sep. 4, 2013, which claims priority of German Patent Application DE 10 2012 215 861.8 filed Sep. 6, 2012.

FIELD OF THE INVENTION

The invention relates to a remote control unit for an objective and for a camera. The remote control unit comprises at least one base part, an operating element movable relative to the base part, an evaluation and control unit for generating a control signal in accordance with the position of the operating element and an output device for outputting the control signal to an associated camera.

BACKGROUND OF THE INVENTION

Such a control unit in a conventional or electronic motion picture camera (movie camera) allows a remote control of, for example, a focus setting device of the camera by an assistant cameraman. The evaluation and control device of the remote control unit generates a control signal in accordance with the position of the operating element and transmits this control signal via the output device (in a wireless or wired manner) to the focus setting device of the camera. The focus setting device in this respect has a motor unit which rotates an objective ring in accordance with the control signal transmitted by the remote control unit and hereby changes a focus setting.

A remote control unit of said kind is described in WO 2010/046237 A1 incorporated herein by reference. This remote control unit furthermore has a display device integrated into the base part for displaying a focus scale and further symbols and also a laterally arranged operating element (hand wheel) for setting the focus (image sharpness). The remote control unit provides the possibility of presetting specific desired focus values which correspond to measured distances in the motif.

The remote control unit is typically operated by the assistance cameraman during a film recording with the camera, with the assistant cameraman carrying out the required remote-controlled settings at the camera objective in accordance with a control routine which was laid down by the cameraman or in agreement with the cameraman before the film recording. The parameters defining the desired control routine (e.g. starting value and/or end value) are marked as presettings at or in the remote control unit, with these presettings being able to be input and saved electronically or also only being able to be applied as markings applied by hand.

To maintain the previously defined control routine as exactly as possible during the film recording, the assistant cameraman must permanently keep an eye on the film scene being played out in front of him. At the same time, however, he must monitor the position of the operating element of the remote control unit, in particular relative to a respective presetting, which should take place where possible without any disturbing distraction from the film scene and without any impairment of the film recording. The monitoring of the position must additionally also be reliably possible under unfavorable light conditions.

SUMMARY OF THE INVENTION

It is an object of the invention to further improve a remote control unit of said kind for an objective and for a camera, in particular with respect to the possibility of a monitoring of the position of the operating element of the remote control unit which neither disturbs the film recording nor distracts from the film scene to be recorded.

According to the invention the remote control unit comprises a feedback device, wherein the evaluation and control device is adapted to control the feedback device in dependence on the position of the operating element for generating at least one feedback signal which can be perceived by a user of the remote control unit and which can in particular be an optical feedback signal or a haptic feedback signal.

The remote control unit in accordance with the invention thus has a feedback device which is adapted to generate feedback signals which can be perceived in a sensory manner by the user holding the remote control unit. Said feedback signals can, for example, be optical signals (such as intensity changes or color changes) or haptic signals (such as mechanical vibrations) such as will be explained in more detail in the following. Generating a respective signal is to be understood in this respect such that the feedback signal is due to the control of the feedback device and does not only result directly from the position of the operating element.

If therefore a preset position is reached due to an actuation of the operating element relative to the base part or if a specific approach toward a preset position has taken place, this can be detected by an evaluation and control device and can be displayed (i.e. indicated) to the user (e.g. the assistant cameraman) in a perceivable manner by means of the correspondingly generated feedback signal without the user, for example, constantly having to compare a value scale with an index. The user can thus concentrate on the film scene to be recorded without constantly having to look at the remote control unit since the respective feedback signal can be perceived haptically, for example completely without any change of gaze, or can be recognized in the peripheral visual field or since only a brief glance is sufficient for the signal recognition. The respective signal can in particular be so discreet that neither the acoustic nor the visual portion of the film recording is impaired by the signal.

Apart from the feedback device, the remote control unit can be configured as described in WO 2010/046237 A1. The operating system can in particular be rotatable about an axis of rotation relative to the base part and said position of the operating system can then be a rotary position of the operating element. The operating element can, for example, be a hand wheel. It is alternatively possible that the operating element is movable in translation relative to the base part. The operating element can in particular be displaceable along a path, with said position of the operating element then being able to be a slide position of the operating element. The path along which the operating element is displaceable does not necessarily have to be straight. It is, however, preferably an at least substantially straight path. In this case, the movement of the operating element is therefore a straight-line movement such as can be the case, for instance, with a slider for an aperture setting device.

The feedback signal perceivable by the user is preferably a signal only changeable in discrete stages. It can in particular be a binary signal, i.e. in this embodiment the feedback signal can only adopt two different states. Provision can, for example, be made that the feedback signals is only generated at all on a reaching of a preset position of the operating element and the feedback signal is otherwise not generated or is not generated in a perceivable manner. A feedback signal only changeable in discrete steps generally has the advantage with respect to a continuously changeable signal that the user can perceive a change in the feedback signal much more clearly, in particular if he does not directly observe the remote control unit and specifically its feedback device.

In accordance with an advantageous embodiment, the evaluation and control unit is adapted to control the feedback device in dependence on the position of the operating element to generate different feedback signals. The feedback signals can, for example, differ with respect to their duration (e.g. short/long), their intensity (e.g. strong/weak or bright/pale), their frequency (e.g. vibration frequency or color) and/or their number and time sequence (e.g. specific pulse sequences). Different states can thus be signaled to the user by use of different feedback signals, for example, on the one hand, the approach to a preset desired focus value (being less than a specific distance from the preset desired focus value) and, on the other hand, the actual reaching of the preset desired focus value (after a continued movement of the operating element).

The evaluation and control device can in particular be adapted to control the feedback device to generate a first feedback signal on a reaching of a predetermined first position of the operating element (which can be set by the user). On a reaching of at least one predetermined second position of the operating element (which can likewise be set by the user) and/or on a reaching of at least one predetermined difference of the position of the operating element relative to the predetermined first position (which difference can be set by the user), the evaluation and control device controls the feedback device to generate a second feedback signal which differs from the first feedback signal. In addition to a desired focus value, for example, one or more limit values (limits) can thus be set for this purpose, with the reaching of the limit or limits being signaled, for example, by a single or multiple short feedback signal and the reaching of the desired focus value being signaled by a long or continuous feedback signal. Said positional difference can, for example, be an angle of rotation spacing or a displacement spacing depending on the type of movement of the operating element.

It is further preferred if the evaluation and control device is adapted to control the feedback device over a range of different positions of the operating element to generate a feedback signal. In this manner, not only preset individual values of the position (e.g. in accordance with different focus values), but whole value ranges can be signaled at any point in time at which the position of the operating element corresponds to this range (e.g. by varying an illumination color). In this respect, the feedback signal can be continuously dependent on the position of the operating element within said range and can vary, for example, with respect to its intensity or frequency (e.g. frequency of a mechanical vibration, color).

It is particularly advantageous if the feedback device comprises a vibration device which can be controlled to generate a vibration signal feelable by the user of the remote control unit. The vibration signal thus forms said feedback signal. A vibration in connection with the invention is designated as a single to and fro movement or as a plurality of consecutive to and fro movements (i.e. mechanical oscillations) of one part relative to another part of the remote control unit. Vibrations are particularly well-suited as signals in an environment in which visual and acoustic signals would represent disturbances. In addition, the perceptibility of vibrations is as a rule limited to that person who has direct contact with the vibrations.

If, for example due to an actuation of the operating element, a preset desired focus value is reached or a specific approach to a preset desired focus value has taken place, this can advantageously only be indicated to the user (e.g. assistant cameraman) in a perceivable manner by means of the generated vibrations without the film recording being disturbed by visual or acoustic signals. The vibration device required for this purpose is an inexpensive component part such as is widely used for mobile phones. The vibration device can in particular be formed by an electric motor having an imbalance driven thereby (so-called vibration motor). A piezo drive is also possible, for example.

In accordance with an advantageous embodiment, the vibration device is arranged at an outer side of the base part or of the operating element. The vibration signal generated by the vibration device is hereby particularly easily feelable by the user, whereas the strength of the vibrations can nevertheless be set so small that the vibrations are not acoustically perceptible and also do not impair the actuation of the operating element. If the vibration device is arranged at an outer side of the base part, the user substantially feels the vibration signal at that hand with which he is holding the base part tight so that the other hand actuating the operating element is advantageously not disturbed with respect to its actuation. It can alternatively be advantageous if the vibration device is arranged at an outer side of the operating element since in this case the hand actuating the operating element particularly directly experiences a feedback relating to the adjustment movement carried out by it.

Optionally, the vibration device can substantially be decoupled from the base part and/or the operating element with respect to structure-borne sound. For example, a damping device or a cushioning/damping device can be provided between the vibration device and the base part and/or the operating element.

Alternatively or additionally to said vibration device, the feedback device can comprise an illumination device which can be controlled to generate an illumination signal visible to a user. The illumination signal in this respect corresponds to said feedback signal and can generally comprise all kinds of directly or indirectly transmitted light. The illumination signal can in particular be characterized by its intensity, color, duration, number and sequence and/or by a change to these features. In this manner, the illumination signal and the corresponding information on the position of the operating element can be perceived fast and reliably by a brief glance or by peripheral vision. Features or feature changes of the illumination signal can in particular thereupon be selected as optimized as to how well they can be perceived in the peripheral visual field. The illumination device can have a light source which, for example, comprises one or more light emitting diodes (LEDs) which are in particular of different colors or can be color modulated. Furthermore, the illumination device can e.g. be arranged at an outer side of or within the base part or the operating element of the remote control unit.

The illumination device can in particular be adapted to illuminate the remote control, unit at least partly in accordance with a base illumination characteristic, wherein the illumination signal can have an illumination characteristic different from the base illumination characteristic, for example a different color. If e.g. a preset desired focus value is reached or if a specific approach toward a preset desired focus value has taken place, the color of the illumination can change, for instance from white to green, or the intensity of the illumination can change, for instance by a (single or multiple) brief extinguishing or lighting up. The illumination signal can be unambiguously distinguished from the base illumination characteristic by such a change in the illumination characteristic. A plurality of different illumination characteristics allow the distinction of different preset desired setting values so that, for example, the reaching of a limit can be signaled by an illumination signal of a different color than the reaching of a preset desired setting value.

The illumination device can generally serve for the general illumination of the remote control unit, in particular for the illumination of the operating element and/or of a display device of the remote control unit. This general illumination can then have a base illumination characteristic, for example with respect to its intensity and color, from which the illumination characteristic of the illumination device advantageously differs.

The remote control unit can generally have a display device for displaying at least one symbol (e.g. scale, index, number, arrow) whose position or value corresponds to the position of the operating element or to a desired position of the operating element. The display device (e.g. scale bar, scale cylinder, marking disk which can be written by hand) can generally be provided at the base part or at the operating element. Said illumination device can partly or fully illuminate such a display device. The illumination device can in particular be part of such a display device.

With such an embodiment having an illumination device and a display device, the illumination device can generate background lighting for the display device.

Alternatively or additionally, the remote control unit in such an embodiment can have a masking device which has at least one transparent or partly transparent section and a light-impermeable section in order, respectively, to transmit or screen (i.e. mask) the illumination of the display device (e.g. illumination signal and/or background lighting) generated by the illumination device for different emission directions of the illumination or for different regions of the display device. The light emission can hereby be limited to a narrow angular region which is sufficient for the user of the remote control unit and does not, however, signify any disturbance for the environment (e.g. recorded film scene). This in particular applies to display devices which are not designed as planar, but as cylindrical, for example. A continuous progression of the degree of transparency is preferably provided between the respective transparent or partly transparent section and the respective light-impermeable section of the masking device, to avoid abrupt transitions. The user thus perceives the movement of, for example, a specific scale value in the visible part of the display device as a gradual appearance.

It is generally preferred if the feedback device generates said feedback signal without in this respect counteracting a movement of the operating element relative to the base part (e.g. by an abrupt or gradual movement resistance). The sensory feedback to the user thus takes place without impairment of the actuation of the operating element so that a particularly exact control is possible. This is, for example, ensured when the feedback device comprises a vibration device or an illumination device.

Alternatively to this, the feedback device can, however, comprise a latch lock generating device which can be controlled for the selective generation of a latch lock of the operating element with the base part feelable by a user. Such a latch lock is to be understood as a movement resistance which has to be briefly overcome to continue the actuation of the operating element. Such a latch lock can be selectively generated, for example, by an electromagnetic coupling of the operating element with the base part.

In all of the aforesaid embodiments, a display device of the remote control unit (in particular the already named display device) can be configured as an electronic display device for electronically representing at least one symbol, wherein the evaluation and control device is adapted to vary the position or the value of the represented symbol in dependence on a change in the position of the operating element and to control the feedback device to generate the feedback signal when the position of the operating element corresponds to a predefined position of the represented symbol on the electronic display device or to a predefined value of the represented symbol. Said electronic display device can be configured as flat and rectangular (as in WO 2010/046237 A1) or as round, for example cylindrical. The represented symbol can in particular comprise a scale (e.g. a focus scale), a number (e.g. instantaneously set focus value, desired focus value) and/or at least one mark (e.g. arrow mark for a preset desired focus value).

The position or the value of a symbol which is applied to a display device by hand or which is represented electronically at a displace device can generally define a setting value (e.g. instantaneously set focus value), wherein the control signal for the camera generated by the evaluation and control device includes the setting value. It is preferred if an index associated with the display device is provided at the base part or if the electronic display device is adapted to represent an index. In both cases, the relative position of the displayed or electronically represented symbol with respect to the index can define said setting value. Furthermore, the relative position of the displayed or electronically represented symbol with respect to the index can correspond to said criterion for the control of the feedback device to generate the feedback signal.

In accordance with a further advantageous embodiment, the remote control unit can have a position encoder connected to the evaluation and control device for detecting the position of the operating element relative to the base part. It is in this respect preferably an absolute value position encoder, in the exemplary case of an operating element rotatable about an axis of rotation, for instance, an absolute value rotary encoder. This means that an unambiguous position signal is associated with each position of the operating element relative to the base part without a separate calibration being required after every switching on of the remote control unit. It is moreover preferred if the operating element is freely movable relative to the base part within the provided actuation range, i.e. without restoring forces which act on the operating element in the direction of a zero position.

Said output device of the remote control unit can comprise any desired interface for outputting the generated control signal to the camera. The remote control unit can generally be configured for a wired or wireless transmission of said control signal to a reception device of the camera (e.g. focus setting device).

The control signal generated by the remote control unit can comprise a focus control signal for controlling a focus setting device and/or an aperture control signal for controlling an aperture setting device and/or a focal length control signal for controlling a focal length setting device (zoom apparatus) of a motion picture camera.

BRIEF DESCRIPTION OF THE DRAWINGS

The invention will be explained in the following by way of example with reference to the drawings.

DETAILED DESCRIPTION OF THE PREFERRED EMBODIMENTS

Figure 1:
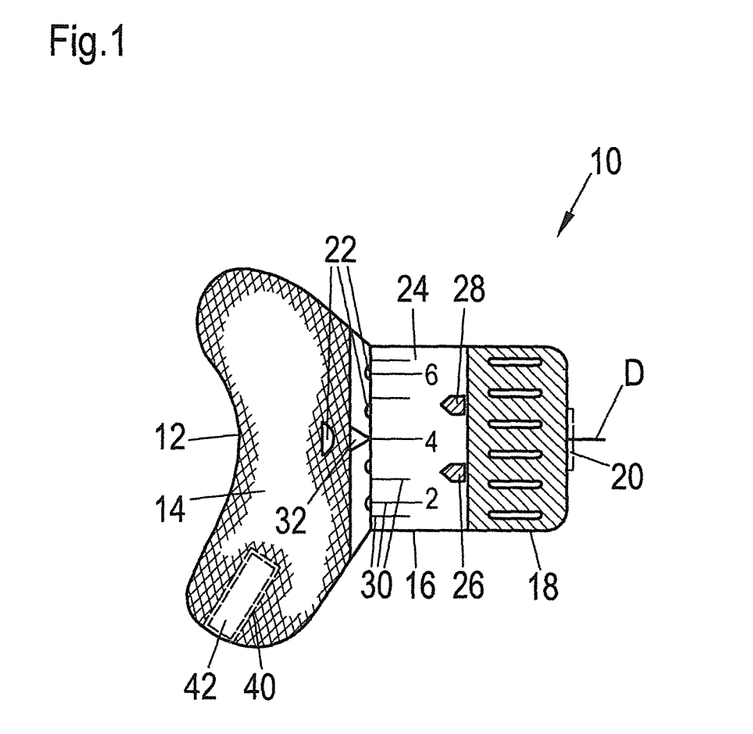
FIG. 1 shows a side view of a first embodiment of a remote control unit.

FIG. 1 shows an embodiment of a remote control unit 10 having a base part 12 which has a grip part 14. A cylindrical electronic display device 16 and adjacent thereto a cylindrical operating element 18 are arranged laterally at the grip part 14. The operating element 18 is rotatable about an axis of rotation D relative to the base part 12. A button 20 shown dashed can be provided as an input device at en end surface of the operating element 18. Light emitting diodes (LEDs) 22 for illuminating the electronic display device 16 can be provided at the base part 12. The display device 16 can be arranged at the operating element 18 (.e. moving with it) or can be fixedly connected to the base part 12.

The remote control unit 10 additionally has an evaluation and control device 50 provided in the region of the base part 12 (FIGS. 3 to 5; not shown in FIG. 1) which is configured for wireless communication with a focus setting device of a motion picture camera. For this purpose, the evaluation and control device 50 is connected to an output device 54 (FIGS. 3 to 5; not shown in FIG. 1) which is formed by a radio transmission device here. The evaluation and control device 50 is furthermore connected to a position encoder 52 (FIGS. 3 to 5; not shown in FIG. 1) for detecting an angular position (including an angular position change) of the operating element 18 relative to the base part 12. The evaluation and control device 50 is adapted to generate a focus control signal in dependence on the detected angular position of the operating element 18 and to transmit it via said radio transmission device to the focus setting device of the camera.

The evaluation and control unit 50 furthermore controls the electronic display device 16 for the electronic representation of a focus scale 24. The focus scale 24 comprises different focus values 30 which are represented in the form of lettered and unlettered indices. The focus scale 24 furthermore comprises in the embodiment shown here two focus value marks 26, 28 which respectively indicate a preset desired focus value to the user. The focus value marks 26, 28 can be programmed in a freely selectable manner by the user with the assistance of the button 20 in a configuration mode of the remote control unit 10. The evaluation and control device 50 is adapted to vary the representation of the focus scale 24, including the focus value marks 26, 28, relative to an arrow-shaped index 32 provided at the base part 12 on a rotation of the operating element 18 relative to the base part 12. The position of the focus scale 24 relative to the index 32 thus represents the instantaneously set focus value (corresponding to the focus control signal currently transmitted to the camera). The position of the respective focus value mark 26, 28 relative to the index 32 indicates the still remaining distance (angle of rotation) between the respective preset desired focus value and the instantaneously set focus value to the user.

A vibration device 42 which serves as a feedback device for the user and which extends up to the outer side of the grip part 14 is provided in a recess 40 of the grip part 14. Said evaluation and control device 50 is adapted to control the vibration device 42 in dependence on the detected rotational position of the operating element 18 relative to the base part 12 to generate a vibration signal feelable by the user. The evaluation and control device in particular causes the vibration device 42 to generate vibrations when a rotary actuation of the operating element 18 has taken place such that one of the two focus value marks 26, 28 represented at the electronic display device 16 has reached the level of the index 32. The user can thus operate the remote control unit "blindfold" and his attention is nevertheless reliably drawn to the reaching of the respective preset desired focus value without a perceivable disturbance on the environment emanating from the remote control unit 10.

Figure 2:
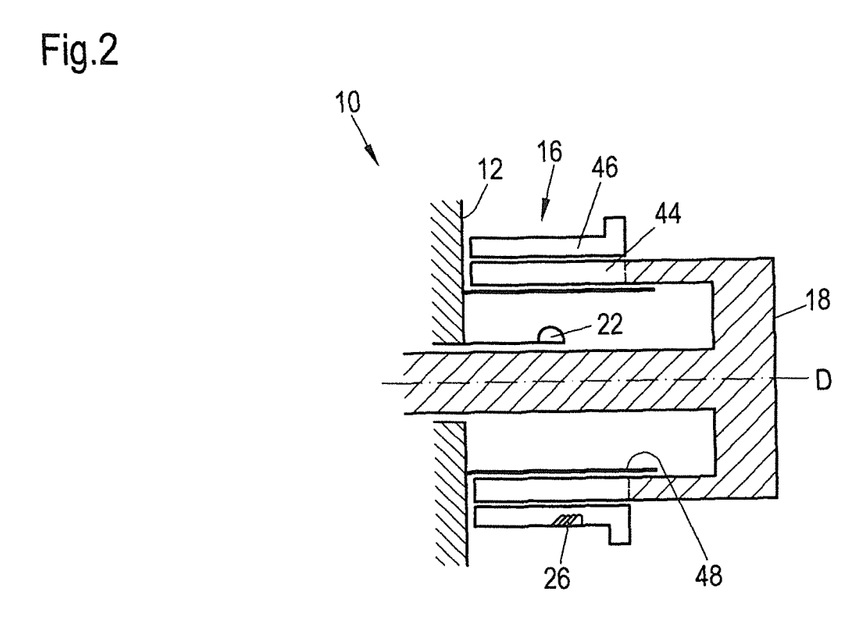
FIG. 2 shows a longitudinal sectional view of a second embodiment of a remote control unit.

FIG. 2 shows in a schematic longitudinal section an operating element 18 of a further embodiment of a remote control unit 10, with only a section of a base part 12 of the remote control unit 10 itself being shown. The operating element 18 is substantially cylindrical and is at least partly hollow in its interior. The operating element 18 is rotatably supported about an axis of rotation D at the base part 12 via a shaft. The cylindrical outer side of the operating element 18 comprises a display section 44 at which a removable and adjustable cylindrical marking ring 46 is arranged. The marking ring 46 is in particular suitable to define and display preset desired focus values. The display section 44 and the marking ring 46 thus form a display device 16 for displaying set and/or desired focus values. The marking ring 46 bears a focus value mark 26 by way of example.

Figure 3:
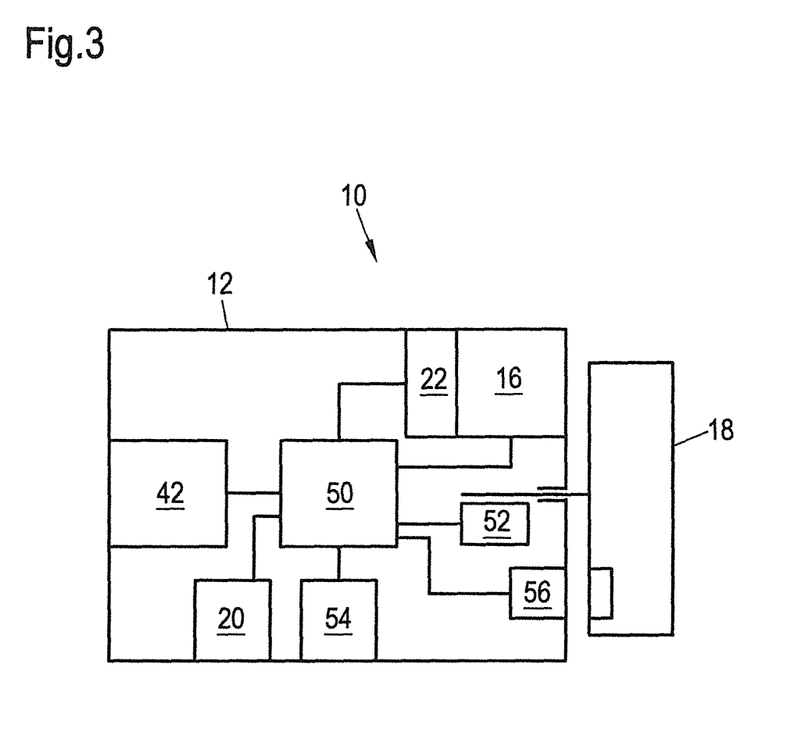
FIG. 3 shows a block diagram of the embodiment of the remote control unit shown in FIG. 1.
Figure 4:
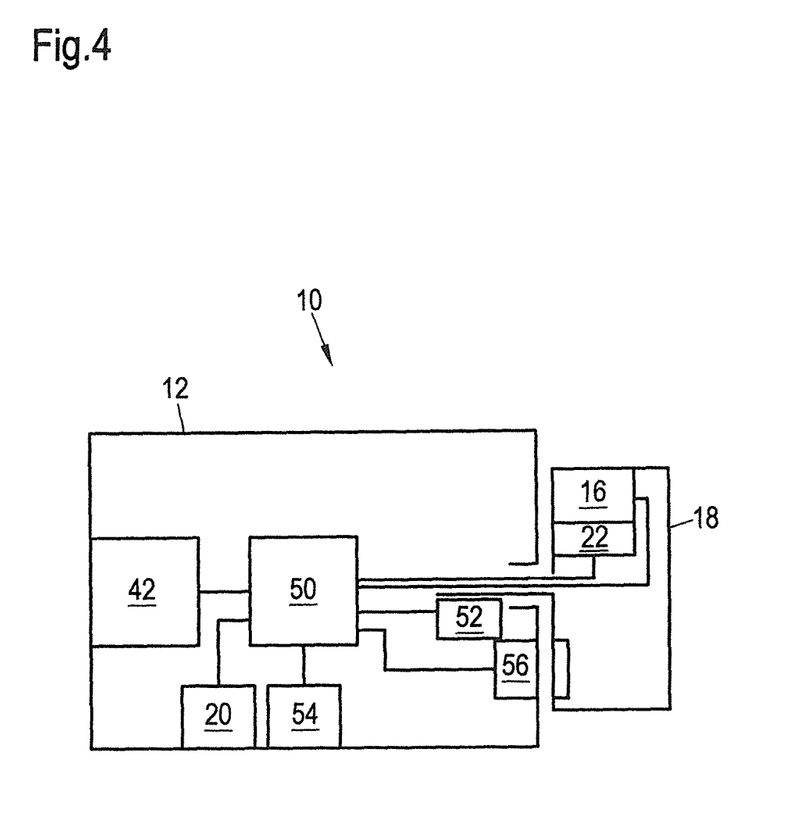
FIG. 4 shows a block diagram of the embodiment of a remote control unit shown in FIG. 2.
Figure 5:
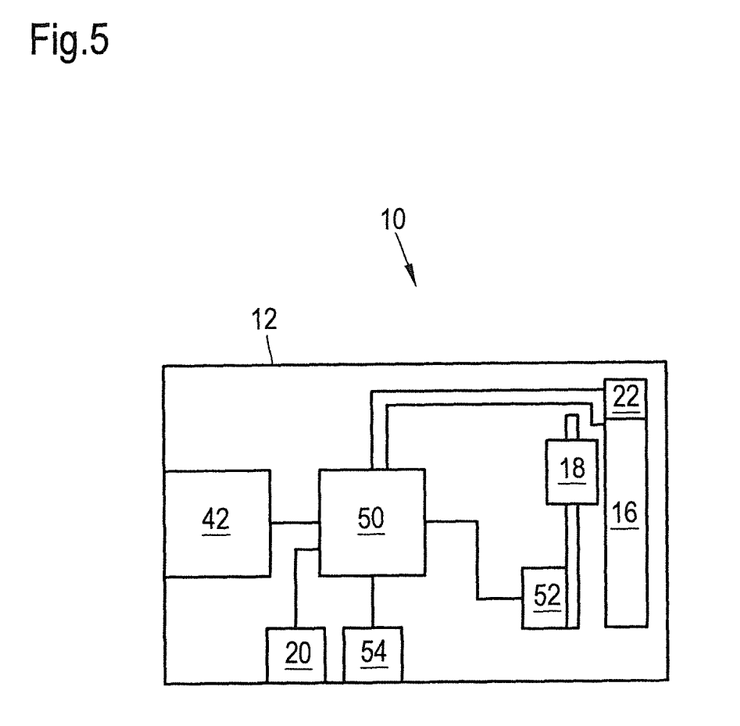
FIG. 5 shows a block diagram of a further embodiment of a remote control unit.

At least one light emitting diode 22 is arranged in the interior of the operating element 18; it is fixedly connected to the base part 12 and its light emission is controlled by an associated evaluation and control device 50 (FIGS. 3 to 5; not shown in FIG. 2). The display section 44 and the marking ring 46 are partly transparent so that light from the light emitting diode 22 can exit the operating element 18 through the display section 44 and the marking ring 46 and can be perceived by a user of the remote control unit 10. The light emitting diode 22 thus forms an illumination device which generates background lighting for the display unit 44 and the marking ring 46 in accordance with a base illumination characteristic. In addition, the light emitting diode 22 can be controlled by the evaluation and control device 50 to generate an illumination signal which is dependent on the rotary position of the operating element 18 and which has an illumination characteristic differing from the base illumination characteristic, for example a different color or a different brightness. An assistant cameraman can hereby, for example, recognize from the illumination signal transmitted by the light emitting diode 22 the reaching of a desired focus value which corresponds to the focus value mark 26 on the marking ring 46.

If, as in the embodiment in accordance with FIG. 2, the respective mark (e.g. focus value mark 26) should not be represented electronically, but should rather be indicated by a manual application to the marking ring 46, said evaluation and control device 50 can be adapted to allow a programming of preset rotary positions of the operating element 18, for example with the assistance of the button 20 already explained in connection with FIG. 1. The user can therefore teach those rotary positions of the operating element 18 which correspond to the manually applied marks and whose reaching is intended to trigger the generating of a feedback signal (e.g. change in an illumination characteristic) before the remote control operation of the evaluation and control device 50.

As is furthermore shown in FIG. 2, a mask 48 which has the shape of a cylinder jacket and which is fixedly connected to the base part 12 can be arranged between the light emitting diode 22 and the display unit 44. The mask 48 can also have a different shape. The mask 48 is configured to transmit illumination signals from the illumination device (light emitting diode 22) only in specific directions, for instance toward the user, and to screen them in other directions. The mask 48 has transparent or at least partly transparent sections as well as light-impermeable sections for this purpose. Transparent sections can in particular be formed by cut-outs.

The mask 48 can have a transparency progression at transitions between transparent or partly transparent sections and light-impermeable sections in which transparency progression the degree of transparency (i.e. the transmission capability) increases or decreases continuously, for example by different pigment densities in or at the mask 48. Gentle transitions between the directions from which the illumination signals can be perceived, and the directions from which the illumination signals cannot be perceived can thereby be achieved. Furthermore, the continuous transitions have the effect that the focus value mark 26 (or a different symbol displayed on the display device) is perceived gradually or "disappears" gradually during the rotary movement of the operating element 18.

The mask 48 in another respect has the effect that illumination signals are substantially transmitted only in the direction of the user of the remote control unit 10 and no negative impairment of the film scene or disturbance of the actors acting therein takes place by the illumination signals.

FIG. 3 shows a block diagram having the essential components of a remote control unit 10 corresponding to the embodiment shown in FIG. 1. An evaluation and control device 50 is connected to a position encoder 52 to detect the rotary position of an operating element 18 relative to a base part 12. An illumination device 22 serves for illuminating a display device 16. If this is an electronic display device 16, it can, as shown, be arranged at the base part 12 and can be controlled by the evaluation and control apparatus 50 in accordance with the rotary position of the operating element 18. Presets can be taught to the evaluation and control device 50 by means of a button 20 in a configuration mode in accordance with a mark at the display device 16 and/or at the operating element 18. The evaluation and control device 50 generates a control signal (e.g. a focus control signal) in accordance with the rotary position of the operating element 18, which control signal is transmitted to an associated movie camera via an output device 54 (e.g. a radio transmission device).

In the example shown, three feedback devices are shown which can be provided alternatively to one another or also accumulatively in any desired combination. These feedback devices are controlled by the evaluation and control device 50 in dependence on the rotary position of the operating element 18 to generate at least one respective feedback signal for the user. The feedback devices in accordance with the embodiment in FIG. 3 comprise, on the hand, said illumination device 22 for the display device 16 and, on the other hand, a vibration device 42. Finally, a latch lock generation device 56 is also shown which can be controlled for the selective generation of at least one latch lock feelable by the user between the operating element 18 and the base part 12. Such a latch lock can be selectively generated, for example, by means of an electromagnet which cooperates with a permanent magnet.

The respective feedback signal is in particular generated when the operating element 18 reaches a preset rotational position which corresponds to a mark at the display device 16 and/or at the operating element 18.

The block diagram shown in FIG. 4 largely coincides with the block diagram shown in FIG. 3, with the embodiment shown in FIG. 4 corresponding to a remote control unit 10 in accordance with FIG. 2. In this embodiment, unlike in FIG. 3, the display device 16 is not arranged with the illumination device associated with it at the base part 12, but rather at the operating element 18. The display device 16 in this respect does not have to be completely arranged within the operating element 18, but can rather also be arranged at least partly from the outside at the operating element 18. The same applies to the illumination device 22 which is preferably provided, however, as shown in FIG. 2, within the operating element 18 so that it is protected and the spatial propagation of its light can be simply monitored. The illumination device 22 and the display device 16 are also connected to the evaluation and control device 50 in this embodiment. In this respect, the connection at the transition from the operating element 18 to the base part 12 can be adapted as a sliding contact or in another manner to the rotational movability of the operating element 18 with respect to the base part 12. The illumination device 22 and/or the display device 16 can, however, also be fixedly arranged relative to the base part 12 (as is shown for the illumination device 22 in FIG. 2) so that a rigid connection is possible.

FIG. 5 shows a block diagram of an embodiment of a remote control unit 10 in which the operating element 18, unlike in the embodiments shown in FIGS. 1 to 4 is designed not as a hand wheel, but rather as a slider. This slider can be displaced by a path which is made here as a straight line, with individual positions along the path corresponding to different aperture values. The position encoder 52 associated with the operating element 18 here is a linear encoder which detects the position of the slider along said path. The display device 16 and the associated illumination device 22 are provided adjacent to the slider at the base part 12. The display device 16 and/or the illumination device 22 can, however, also be provided at the operating element 18 (slider). A latch lock device 56 is not shown in FIG. 5, but can also be provided in this embodiment, for example as controllable electromagnets which are arranged at the base part 12 and which can cooperate with a permanent magnet at the operating element 18. The remaining components of the embodiment shown in FIG. 5 correspond to preceding Figures marked by the same reference numerals.

The invention claimed is:

1. A remote control unit (10) for an objective and for a camera, comprising a base part (12), an operating element (18) movable relative to the base part (12), a controller (50) for generating a control signal in accordance with the position of the operating element (18), an output (54) for outputting the control signal to an associated camera, and a user indication through a feedback device in the remote control unit, wherein the controller (50) is adapted to control the feedback device in dependence on the position of the operating element (18) to generate at least one feedback signal, wherein the at least one feedback signal comprises a haptic signal which is perceivable by a user of the control unit, wherein the controller (50) is adapted to control the feedback device to generate the at least one feedback signal on a reaching of a predetermined position of the operating element (18).

2. A remote control unit (10) in accordance with claim 1, wherein the operating element (18) is rotatable about an axis of rotation (D) relative to the base part (12) and said position of the operating element (18) is a rotary position of the operating element (18); or wherein the operating element (18) is displaceable along a path relative to the base part (12) and said position of the operating element (18) is a slide position of the operating element (18).

3. A remote control unit (10) in accordance with claim 1, wherein the controller (50) is adapted to control the feedback device in dependence on the position of the operating element (18) to generate different feedback signals.

4. A remote control unit (10) in accordance with claim 3, wherein the controller (50) is adapted to control the feedback device to generate a first feedback signal on a reaching of a predefined first position of the operating element (18) and to control the feedback device to generate a second feedback signal which differs from the first feedback signal on a reaching at least one of a predefined second position of the operating element (18) and a predefined positional difference of the operating element (18) relative to the predefined first position.

5. A remote control unit (10) in accordance with claim 1, wherein the controller (50) is adapted to control the feedback device over at least a range of different positions of the operating element (18) relative to the base part (12) to generate the at least one feedback signal.

6. A remote control unit (10) in accordance with claim 1, wherein the feedback device comprises a vibrator (42) adapted to generate at least one vibration signal feelable by the user of the remote control unit.

7. A remote control unit (10) in accordance with claim 6, wherein the vibrator (42) is arranged at an outer side of the base part (12) or at an outer side of the operating element (18).

8. A remote control unit (10) for an objective and for a camera, comprising a base part (12), an operating element (18) movable relative to the base part (12), a controller (50) for generating a control signal in accordance with the position of the operating element (18), an output device (54) for outputting the control signal to an associated camera, and a user indication through a feedback device in the remote control unit, wherein the controller (50) is adapted to control the feedback device in dependence on the position of the operating element (18) to generate at least one feedback signal perceivable by a user of the control unit, wherein the feedback device comprises an illumination device (22) adapted to generate at least one illumination signal visible to a user of the remote control unit, wherein the remote control unit (10) has a display device (16) for displaying at least one symbol (24, 26, 28) whose position or value corresponds to the position of the operating element (18) or to a desired position of the operating element (18), with the illumination device (22) being adapted to illuminate the display device (16) partly or completely, and wherein the remote control unit (10) has a masking device (48) which has at least one transparent or partly transparent section and one light-impermeable section in order to transmit or to screen the illumination of the display device (16) generated by the illumination device (22) for different emission directions of the illumination or for different regions of the display device (16).

9. A remote control unit (10) in accordance with claim 8, wherein the masking device (48) has a continuous progression of a change in the degree of transparency between the transparent or partly transparent section and the light-impermeable section.

10. A remote control unit (10) for an objective and for a camera, comprising a base part (12), an operating element (18) rotatable relative to the base part (12), a controller (50) for generating a control signal in accordance with the position of the operating element (18), an output device (54) for outputting the control signal to an associated camera, and a cylindrical display section (44) which is provided at the rotatable operating element (18) and at which a marking ring (46) can be arranged, wherein the remote control unit (10) has a light source (22) which is arranged in an interior of the operating element (18) and which is adapted to generate background lighting for the display section (44), and wherein the remote control unit (10) has a mask (48) which has at least one transparent or partly transparent section and one light-impermeable section in order, respectively, to transmit or to screen an illumination of the display section (44) generated by the light source (22) for different emission directions of the illumination or for different regions of the display section (44).

11. A remote control unit (10) in accordance with claim 10, wherein the light source (22) and the mask (48) are fixedly connected to the base part (12), and wherein the mask (48) is arranged between the light source (22) and the display section (44).

12. A remote control unit (10) in accordance with claim 11, wherein the display section (44) is partly transparent.

13. A remote control unit (10) in accordance with claim 11, wherein the operating element (18) is substantially cylindrical and at least partly hollow in its interior.

14. A remote control unit (10) in accordance with claim 13, wherein the light source comprises at least one light emitting diode.

15. A remote control unit (10) in accordance with claim 10, wherein the light source (22) generates the background lighting for the display section (44) in accordance with a base illumination characteristic.

16. A remote control unit (10) in accordance with claim 10, wherein the at least one transparent section of the mask (48) is formed by a cut-out.

17. A remote control unit (10) in accordance with claim 10, wherein the mask (48) has a continuous progression of a change in the degree of transparency between the transparent or partly transparent section and the light-impermeable section.

\* \* \* \* \*